July 10, 1962 G. JANSEN 3,043,337
MIXING VALVE
Filed Jan. 4, 1960

INVENTOR.
GERHART JANSEN
BY *M. Ralph Shaffer*
HIS ATTORNEY

United States Patent Office 3,043,337
Patented July 10, 1962

3,043,337
MIXING VALVE
Gerhart Jansen, 918 E. South Temple,
Salt Lake City, Utah
Filed Jan. 4, 1960, Ser. No. 302
3 Claims. (Cl. 137—625.41)

This invention relates to fluid mixing valves and, more particularly, to a new and improved mixing valve which may be regulated to mix a plurality of fluids in a manner such that the quantity or flow rate of fluid discharge and also fluid proportion may be regulated independently, and this with a single control.

An object of the present invention is to provide a new and improved mixing valve wherein quantity or flow rate of discharge and also the proportion of fluids in the composite mixture discharge may be regulated independently by a single control.

A further object of the present invention is to provide a control valve of the spherical type wherein a water-tight seal (not of Babbitt metal) exists between the working spheres of the valve.

A further object of the present invention is to provide a mixing valve of the type described wherein the seal of the valve is responsive to existing fluid pressure.

A further object of the invention is to provide a new and useful valve of the type described wherein spring replacement only (without valve redesign) is needed to adapt the valve to areas of different pressures.

An additional object of the present invention is to provide a new and useful mixing valve wherein mixture proportion is unaffected when the valve is being regulated as to volume of discharge or is shut off for a period of time.

According to the present invention the mixing valve basically includes a generally spherical, valve casing shell having a pair of fluid inlet ports and a discharge port, and a spherical valve body movably disposed within the valve casing shell and having a pair of fluid admittance apertures and a discharge aperture. The valve casing is provided with a slot-like guideway for a valve body shaft which is selectively rotatable by a handle affixed thereto. The fluid admittance apertures of the valve body are so disposed with relation to the fluid inlet ports of the valve casing so that arcuate translation of the valve body shaft within its slot guideway will vary only the proportion of the mixture without varying the volume of the discharge. Thus, where, for example, hot and cold water flows are to be mixed, the temperature of the same may be varied without changing the volume of the water discharge.

The valve body is rotatable by the valve body shaft (about the shaft's axis) so as to vary the registry of the fluid admittance apertures of the valve body with the respective inlet ports of the casing, so as to vary the quantity of fluid discharge, and this without varying the temperature or proportion of the mixture.

Rather than Babbitt metal, which is subject to wear and leakage, the present invention employs a pair of sealing cylinders which are ground at their innermost ends in a spherical manner so as to abut and match with the spherical surface of the valve body of the valve. These sealing cylinders are preferably supplied with pressure fins which are responsive to fluid pressure for keeping the sealing cylinders tightly against the valve body. A pair of compression springs co-act with the sealing cylinders for advantages hereinafter to be noted.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
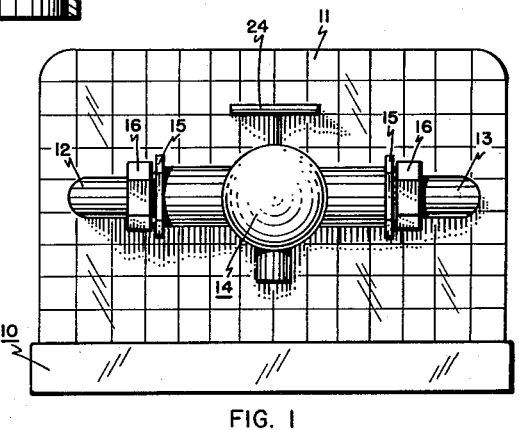
FIGURE 1 is a front elevation of the mixing valve of the present invention when the same is installed over a sink, for example, and is connected to the hot and cold water pipes associated therewith.

In FIGURE 1 the sink 10 is supplied with tiled area 11 having hot and cold water pipes 12 and 13, respectively, disposed therethrough and connected to valve 14 by means of unions 15 and nut fittings 16 associated with the pipes 12 and 13.

Figure 2:
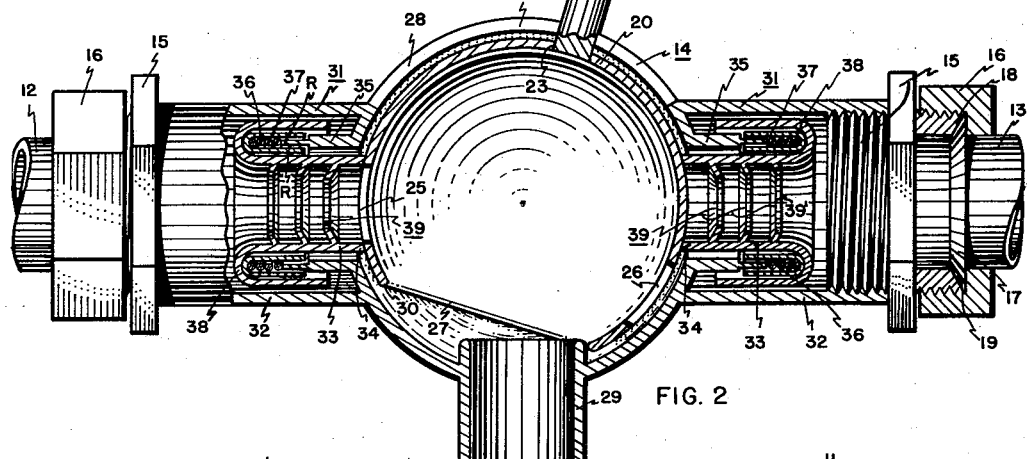
FIGURE 2 is an enlarged, front elevation, principally in vertical section, of the mixing valve of the present invention, illustrating its general construction and attachment to the associated water pipes.

FIGURE 2 illustrates that the hot and cold water pipes 12 and 13 may each have a flared end 17 such that surface 18 thereof may be provided to cooperate with the seat 19 of each of the unions 15.

The valve 14 proper comprises a spherical valve body 20, a generally cylindrical, valve casing shell 21 enclosing the valve body 20, a shaft 22 (fitted into aperture 23 of valve body 20 and secured to the latter by a heated, press-fit for example), and a handle 24 mounted and keyed to shaft 22 in a usual manner.

It will be seen with reference to FIGURE 2 that the spherical valve body is provided with fluid admittance apertures 25 and 26 and also with discharge aperture 27. In a preferred form of the invention the valve body 20 is a hollow spherical shell so as to offer minimum restriction to fluid flow and to provide optimum communication among the apertures 25, 26 and 27.

With respect to the valve casing 21, it will be noted that the same is provided with an elongated, slot-like guideway 28 to accommodate the admission of shaft 22 therethrough and also to provide a guide for the latter's arcuate, translational motion.

The purpose for the existence of slot 28, and the movement of shaft 22 disposed therewithin, is to vary the temperature of the composite fluid mixed within the valve body 20 and discharged therefrom without sensibly altering the volume or rate of flow of the discharge. It will be seen with reference to FIGURE 2 that the discharge port 29 of the valve casing shell 21 may preferably comprise a nozzle which extends upwardly into the interior of the casing shell 21 so as to come in contact, selectively, with the circular edge 30 of spherical valve body 20, so as to provide a limit stop for valve body 20 in order that the apertures 25 and 26 thereof may not overshoot their respective fluid inlets. Of course, rather than rely upon such engagement the physical dimensions of the guideway 28 may be such as to provide the two direction stop feature.

We now come to a consideration of the fluid inlet ports 31 which are disposed on both side areas of the spherical valve body 20. These fluid inlet ports 31 each comprise an outer cylindrical member 32, a sealing cylinder 33 each having a spherically ground, bearing end 34 abutting the spherical valve body 20, a medial, cylindrical, guide member 35 which is integral with (and therefore fixedly disposed with respect to) the outer cylindrical members 32, and a compression spring 36. If desired, the medial, cylindrical, guide member 35 of each of the fluid inlet ports of the casing may be interiorly and exteriorly recessed at R so as to accommodate the insertion of ring member 37 which is of U-configured cross section. This ring member 37 seats the compression spring 36 and abuts the sealing cylinder 33 at the latter's flared, doubled-back end 38. The sealing cylinders 33 may each be provided with fin means 39 which may take a general form of a plurality of conically configured washers affixed to the interior surface of the cylindrical sealing member 33. These washers 39' should be graduated so that the washer with the smallest aperture (40) may be disposed nearest the valve body 20. The purpose of the plurality of fin washers 39' (or fin means 39) is to render the sealing cylinders 33 responsive to fluid pressure so that the cylinders 33 may be forceably urged against the exterior surface of valve body 20. Since the ends 34 of sealing cylinders 33 are spherically ground, these ends will form fluid seals with the spherical valve body 20 so as to prevent the seepage of fluid between the valve body 20 and its casing to the slit and handle areas, for example. Thus, the employment of Babbitt metal, which would otherwise be necessary, is avoided. It is well known to the art that Babbitt metal seals are subject to frictional wear and have little built-in compensation when wear takes place. In the present invention, the pressure upon the sealing cylinders 33 in general, and upon the fin means 39 in particular, keeps these sealing cylinders at all time against the outer surface of the spherical valve body 20.

The purpose for the inclusion of the two springs 36 is to lend resilience to the structure and to accommodate slight variations which may exist in the outer surface of the valve body 20 but, more especially, each spring serves, by virtue of its appropriate spring constant, to deter binding between the sealing cylinders 33 and a valve body 20 in excessive pressure areas. Thus, the valve bodies need not be redesigned (as to pressure fins, and so forth) when the valve is to be used in differing pressure areas; rather, the selection of a spring with an appropriate spring constant is used, thus substracting appropriately from the force exerted upon the sealing cylinders by water pressure upon the several fins 39'.

The medial, guide members 35 are cylindrical in conformation and serve (together with ring members 37, if used) to guide the travel of the sealing cylinders 33 in the presence of wear. Thus, it will be noted that the fluid from pipe 12 will enter the valve casing shell 21 at end 34 of the sealing cylinder 33 on the left. Correspondingly, fluid coming from pipe 13 will enter the valve at the end 34 of the sealing cylinder 33 on the right. It will be noted in connection with FIGURE 2 that the apertures 25 and 26 of valve body 20 are offset with respect to registry of both of the apertures 25 and 26 with the end openings 34 of both of the sealing cylinders 33 at the same identical time. When the aperture 25 is in complete registry with end 34 of the sealing cylinder 33 on the left, the valve will discharge solely that fluid proceeding through the pipe 12. There will be no fluid transmitted through pipe 16 to discharge port 29 since the aperture 26 will be completely out of registry within 34 of sealing cylinder 33 on the right. Correspondingly, the aperture 26 (see FIGURE 3) may be disposed in complete registry with the sealing cylinder 33 on the right, and the aperture 25 disposed completely out of registry with the sealing cylinder 33 on the left, so that only fluid (such as cold water) will be conducted from pipe 13 to discharge port 29.

Figure 3:
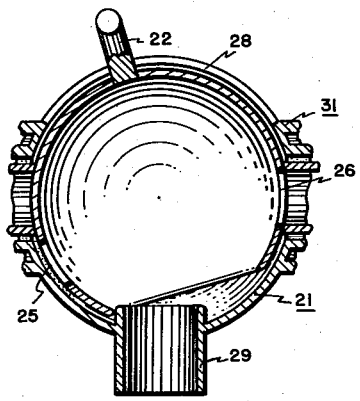
FIGURES 3 and 4 are fragmentary vertical sections of the mixing valve, are of slightly reduced size when compared to FIGURE 2, and illustrate two additional dispositions of the valve body relative to its casing.
Figure 4:
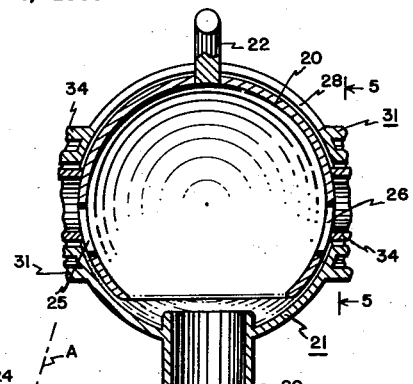

Additionally, FIGURE 4 illustrates that the apertures 25 and 26 of valve body 20 may both be half way in registry with the respective, sealing cylinder ends 34 so that the fluids coming from both of the pipes 12 and 13 will be mixed within the valve body 20 and be discharged at port 29. However, it is important to note in connection with FIGURES 2, 3 and 4 that the design and positioning of the apertures may be such that, while the temperature (i.e. mixture proportion) of the discharged composite fluid will be varied by varying the position of shaft 22 as illustrated in FIGURES 2, 3 and 4, the volume of fluid discharge at port 29 will remain substantially the same. There may exist a number of sizes and shapes of the apertures 25 and 26 and the sealing cylinders 33 to accomplish this objective.

Figure 5:
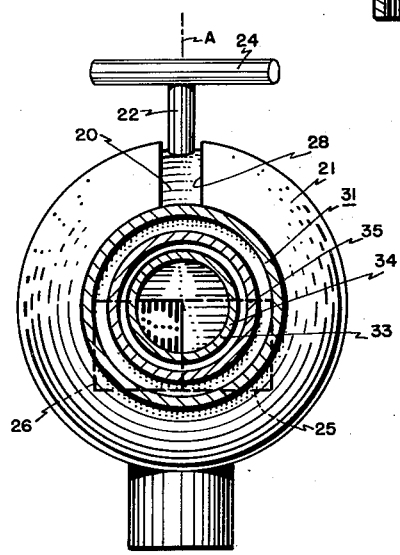
FIGURE 5 is a view taken along the line 5—5 in FIGURE 4, is enlarged, and illustrates the manner in which, for a given mixture proportion, the flow rate of the fluid discharge from the valve may be varied.

Thus, the user will translate the shaft 22 in slot 28 in a direction either to the right or to the left until the fluid discharged is at a desired temperature. Then he turns the handle 24 so as to rotate shaft 22 about axis A to obtain the volume of liquid required. (This procedure of course may be reversed, i.e. by selecting the appropriate volume or fluid flow of water first and then regulating its temperature.) It will be noted in this connection that the rotation of shaft 22 by handle 24 about the shaft's axis A will produce a rotation of valve body 20 about axis A so as either to bring more in-line or more out-of-line the valve body apertures 25 and 26 with the end openings 34 of sealing cylinders 33. FIGURE 5, for example, illustrates the situation where square apertures are exhibited at 25 and 26, where the fluids from pipes 12 and 13 are mixed in equal amounts so as to produce a mixture at a median temperature, but where the valve body 20 has been rotated slightly so as to cut in half the amount of fluid mixed (and subsequently discharged through port 29 in FIGURE 2) from that amount which could be discharged. Smaller or larger amounts of composite fluid will be discharged, of course, by the additional rotation of handle 24.

It is to be noted in connection with the present invention that once the temperature of the composite fluid is determined (by appropriately positioning the shaft 22 within slot 28), the volume of composite fluid discharged may easily be regulated (by rotating shaft 22 about axis A) without disturbing at all the temperature of the liquid. This has been very difficult in connection with devices heretofore employed.

Lastly, the valve is turned off merely by rotating shaft 22 by handle 24 so that the valve body apertures 25 and 26 are disposed completely out of registry with the ends 34 of sealing cylinders 33. It is to be noted in this connection that the disposition of shaft 22 need not be changed in the slot-like guide 28, and if it is not changed, then, merely by rotating shaft 22, the user may again have a fluid discharge at the pre-used (and thus predetemined) temperature.

The invention applies not only to the mixing of hot and cold water, but also to the mixing of other fluids of differing properties wherein controlled mixture of the same is desired.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A mixing valve including, in combination, a generally spherical, valve casing shell having a pair of fluid inlet ports and a discharge port, a spherical valve body movably disposed within said valve casing shell and having a pair of fluid admittance apertures and a discharge aperture, all of said apertures being in communication with each other within the valve body, a shaft affixed to said valve body, said casing exhibiting an elongated, slot-like guideway admitting said shaft, and handle means affixed to said shaft for rotating the same, said shaft being arcuately translatable within said guideway and also rotatable by said handle about the shaft's own axis, said pair of fluid admittance apertures of said valve body being offset with respect to registry with said casing shell inlet ports such that movement of said shaft within said guideway will vary only the proportion of the two fluids in the mixture discharged from the valve without altering the rate of flow of the discharge, whereas rotating said shaft about its axis will vary the rate of flow of the discharge without varying the proportion of the two fluids in the mixture, and wherein each of said fluid inlet ports comprises: an outer, cylindrical member, a medial, cylindrical guide member concentrically and fixedly disposed within said outer, cylindrical member, and a sealing cylinder having a spherically ground, bearing end abutting said valve body to form a fluid seal therewith, said sealing cylinder having a flared, doubled-back end portion disposed around the end of said medial guide member and disposed between said medial guide member and said outer, cylindrical member, and a compression spring concentrically disposed between the end of said medial member and said flared, doubled-back end portion of said sealing cylinder.

2. A mixing valve including, in combination, a generally spherical, valve casing shell having a pair of fluid inlet ports and a discharge port, a spherical valve body movably disposed within said valve casing shell and having a pair of fluid admittance apertures and a discharge aperture, all of said apertures being in communication with each other within the valve body, a shaft affixed to said valve body, said casing exhibiting an elongated, slot-like guideway admitting said shaft, and handle means affixed to said shaft for rotating the same, said shaft being arcuately translatable within said guideway and also rotatable by said handle about the shaft's own axis, said pair of fluid admittance apertures of said valve body being offset with respect to registry with said casing shell inlet ports such that movement of said shaft within said guideway will vary only the proportion of the two fluids in the mixture discharged from the valve without altering the rate of flow of the discharge, whereas rotating said shaft about its axis will vary the rate of flow of the discharge without varying the proportion of the two fluids in the mixture, and wherein each of said fluid inlet ports comprises: an outer, cylindrical member, a medial, cylindrical guide member concentrically and fixedly disposed within said outer, cylindrical member, and a sealing cylinder having a spherically ground, bearing end abutting said valve body to form a fluid seal therewith, said sealing cylinder having a flared, doubled-back end portion disposed around the end of said medial guide member and disposed between said medial guide member and said outer, cylindrical member, a compression spring concentrically disposed between the end of said medial member and said flared, doubled-back end portion of said sealing cylinder, and a ring member having a U-configured cross-section seating said spring and abutting said sealing cylinder at said doubled-back end portion thereof.

3. A mixing valve according to claim 1 wherein said sealing cylinder has interiorly disposed fin means responsive to fluid pressure to urge said sealing cylinder toward and against said valve body.

References Cited in the file of this patent
UNITED STATES PATENTS

| | | |
|---|---|---|
| 982,815 | Hobbs | Jan. 31, 1911 |
| 1,478,688 | Whidden | Dec. 25, 1923 |
| 2,751,185 | Shand | June 19, 1956 |
| 2,845,949 | Parker | Aug. 5, 1958 |